United States Patent
Pizot et al.

(10) Patent No.: US 8,966,588 B1
(45) Date of Patent: Feb. 24, 2015

(54) SYSTEMS AND METHODS OF ESTABLISHING A SECURE CONNECTION BETWEEN A REMOTE PLATFORM AND A BASE STATION DEVICE

(75) Inventors: Laurent Pizot, Camas, WA (US); Pankaj Anand, Cupertino, CA (US); Jacob Refstrup, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 339 days.

(21) Appl. No.: 13/153,401

(22) Filed: Jun. 4, 2011
(Under 37 CFR 1.47)

(51) Int. Cl.
G06F 7/04 (2006.01)
G08B 29/00 (2006.01)
H04L 9/32 (2006.01)
G06F 15/16 (2006.01)
G06F 15/173 (2006.01)

(52) U.S. Cl.
USPC ...... 726/4; 726/5; 726/34; 713/168; 709/208; 709/217; 709/225

(58) Field of Classification Search
USPC ......... 726/3, 4, 5, 34; 713/168; 709/208, 217, 709/225
See application file for complete search history.

(56) References Cited

U.S. PATENT DOCUMENTS

| | | | |
|---|---|---|---|
| 7,359,076 B2 | 4/2008 | Uchino | |
| 8,453,220 B2 | 5/2013 | Pizot et al. | |
| 2003/0083996 A1 | 5/2003 | Fischer | |
| 2004/0006705 A1 | 1/2004 | Walker | |
| 2004/0073684 A1 | 4/2004 | Jodra et al. | |
| 2004/0093419 A1 | 5/2004 | Weihl et al. | |
| 2004/0203668 A1 | 10/2004 | Bowne et al. | |
| 2004/0249934 A1 | 12/2004 | Anderson et al. | |
| 2005/0015456 A1 | 1/2005 | Martinson | |
| 2005/0216602 A1 | 9/2005 | Armstrong et al. | |
| 2005/0270569 A1 | 12/2005 | Hayashi | |
| 2006/0080444 A1* | 4/2006 | Peddemors et al. | 709/227 |
| 2007/0086426 A1 | 4/2007 | Bonta et al. | |
| 2007/0208674 A1 | 9/2007 | Oliver | |
| 2008/0004017 A1* | 1/2008 | Shimizu | 455/435.1 |
| 2008/0028029 A1 | 1/2008 | Hart | |
| 2008/0155152 A1 | 6/2008 | Keeney et al. | |
| 2008/0301784 A1 | 12/2008 | Zhu et al. | |
| 2009/0027700 A1 | 1/2009 | Kim et al. | |
| 2009/0113527 A1 | 4/2009 | Naaman et al. | |
| 2009/0158032 A1 | 6/2009 | Costa et al. | |
| 2009/0181641 A1 | 7/2009 | Fiatal | |

(Continued)

FOREIGN PATENT DOCUMENTS

LV 13720 B 8/2008
WO WO-2007095691 8/2007

OTHER PUBLICATIONS

Niall Roche, The Cybermagic of Whitelists, http://www.streetdirectoty.com/travel_guide/2330/computers_and_the_internet/the_cybermagic_of_whitelists.html.

(Continued)

*Primary Examiner* — Aravind Moorthy

(57) ABSTRACT

Systems and methods of establishing a secure connection between a remote platform and a base station device are disclosed. An example of a method includes registering a base station device with a cloud service. The method also includes requesting from the cloud service, a claim code for the base station device. The method also includes providing access from a remote platform to the base station device by the cloud service based on the registration of the base station device and the claim code.

20 Claims, 3 Drawing Sheets

(56) References Cited

U.S. PATENT DOCUMENTS

| | | | |
|---|---|---|---|
| 2009/0204816 A1 | 8/2009 | Lapstun et al. | |
| 2009/0228967 A1 | 9/2009 | Gbadegesin et al. | |
| 2009/0248632 A1 | 10/2009 | Subramanian | |
| 2009/0254745 A1 | 10/2009 | Ganesan | |
| 2009/0271847 A1 | 10/2009 | Karjala et al. | |
| 2010/0005146 A1 | 1/2010 | Drako et al. | |
| 2010/0039662 A1 | 2/2010 | Reddy et al. | |
| 2010/0082682 A1 | 4/2010 | Kinoshita | |
| 2010/0107225 A1 | 4/2010 | Spencer et al. | |
| 2010/0151831 A1 | 6/2010 | Hao et al. | |
| 2010/0161759 A1 | 6/2010 | Brand | |
| 2010/0175113 A1 | 7/2010 | Borghetti et al. | |
| 2010/0212004 A1 | 8/2010 | Fu | |
| 2010/0242038 A1 | 9/2010 | Berrange et al. | |
| 2010/0277528 A1 | 11/2010 | King et al. | |
| 2011/0093567 A1 | 4/2011 | Jeon et al. | |
| 2011/0099616 A1 | 4/2011 | Mazur et al. | |
| 2011/0213711 A1 | 9/2011 | Skinner et al. | |
| 2011/0235085 A1 | 9/2011 | Jazayeri et al. | |
| 2012/0026536 A1 | 2/2012 | Shah | |
| 2012/0057193 A1* | 3/2012 | Jazayeri et al. | 358/1.15 |
| 2012/0096525 A1 | 4/2012 | Bolgert et al. | |
| 2012/0099146 A1 | 4/2012 | Stokes et al. | |
| 2012/0120436 A1 | 5/2012 | Damera-Venkata et al. | |
| 2012/0159584 A1 | 6/2012 | Pizot et al. | |
| 2012/0233678 A1 | 9/2012 | Pal | |

OTHER PUBLICATIONS

Gideon, Thomas, "More on OAuth and Its Future," Jan. 18, 2010, 5 pages, retrieved on Sep. 21, 2010 at http://thecommandline.net.

Hammer-Lahav, Eran, "Beginner's Guide to OAuth—Part II: Protocol Workflow," Oct. 15, 2007, 15 pages, retrieved on Sep. 21, 2010 at http://hueniverse.com.

Hewlett-Packard, "Customer reviews for hp HP Photosmart e-All-in-One Printer—D110a," including a review as early as Jun. 23, 2010, 5 pages, retrieved on Nov. 6, 2013 at http://reviews.shopping.hp.com.

McCracken, Harry, "HP's ePrint: Print From Devices With No Printing Support," Jun. 7, 2010, 6 pages, retrieved on Nov. 6, 2013 at http://technologizer.com.

Merrill, Scott, "Review: HP Photosmart D110a, the printer with an email address," Sep. 7, 2009, 7 pages, retrieved on Nov. 6, 2013 at http://techcrunch.com.

Ostrow, Adam, "HP Looks to Change the Way We Print," Jun. 7, 2010, 8 pages, retrieved on Nov. 6, 2013 at http://mashable.com.

Smith, Laura, Cloud computing identity management standards could push cloud use, 13 pages, retrieved on Mar. 24, 2011 at SearchCIO.com.

Stone, David, "HP PhotoSmart e-All-in-One D110a," Aug. 20, 2010, 7 pages, retrieved on Nov. 6, 2013 at http://www.pcmag.com.

Taylor, Bret, "OAuth WRAP support in FriendFeed for feedback," Dec. 21, 2009, 2 pages, retrieved on Sep. 21, 2010 at http://bret.appspot.com.

Roche, Niall, "The Cybermagic of Whitelists," available Dec. 25, 2007, <http://www.streetdirectory.com/travel_guide/2330/computers_and_the_internet/the_cybermigic_of_whitelists.html>.

Apple Computer, Inc., "Bonjour: Connect computers and electronic devices automatically, without any configuration." Apr. 2005, <http://hes-standards.org/docs.SC25_WG1_N1164.pdf>.

Hewlett-Packard Development Company, L.P., "HP Web Jetadmin software—overview and features," Jan. 16, 2008, (web page), <http://web.archive.org/web/20080116160241/http://h20331.www2.hp.com/Hpsub/cache/332262-0-0-225-121.html>.

Hewlett-Packard Development Company, L.P., "Security and HP Web Jetadmin 10.1," whitepaper, 2008, <http://www.cannon4.com/solutions/pdf/HP_WJA_security_whitepaper_en.pdf>.

Laurent Pizot et al. (inventors), "Establishing a Secure Connection Between a Print Generation Service and a Base Station Printer," U.S. Appl. No. 13/072,720, filed Mar. 27, 2011, 18 pages.

Laurent Pizot et al. (inventors), "Secure Connections Between a Proxy Server and a Base Station Device," U.S. Appl. No. 13/072,722, filed Mar. 27, 2011, 20 pages.

Oasis, "SOAP-over-UDP Version 1.1," Oasis Standard, Jul. 1, 2009, <http://web.archive,org/web/20100710071459/http://docs.oasis-open.org/ws-dd/soapoverudp/1.1/os/wsdd-soapoverudp-1.1-spec-os.html>.

Wikipedia, "Access control," May 4, 2010, <http://web.archive.org/web/20100504090238/http://en.wikipedia.org/wiki/Access_Control>.

Wikipedia, "Anti-spam techniques," Oct. 4, 2010, <http://web.archive.org/web/20101004152834/http://en.wikipedia.orgiwiki/Anti-spam_techniques>.

Wikipedia, "Antivirus software," Nov. 15, 2010, <http://web.archive.org/web/20101115195952/http://en.wikipedia.org/wiki/Anti-Virus>.

Wikipedia, "Bonjour (software)," Feb, 9, 2010, <http://web.archive.org/web/20100209205426/http://en.wikipedia.org/wiki/Bonjour_2(software)>.

Wikipedia, "Password," Oct. 26, 2010, <http://web.archive.org/web/20101026023312/http://en.wikipedia.org/wiki/Password>.

Wikipedia, "Transport Layer Security," Nov. 12, 2010, <http://web.archive.org/web/20101112221312/http://en.wikipedia.org/wiki/Secure_Sockets_Layer>.

Wikipedia, "WS-Discovery," Nov. 11, 2010, <http://web.archive.org./web/20101111230811/http://en.wikipedia.org/wiki/WS-Discovery>.

* cited by examiner

SYSTEMS AND METHODS OF ESTABLISHING A SECURE CONNECTION BETWEEN A REMOTE PLATFORM AND A BASE STATION DEVICE

BACKGROUND

Mobile devices, including for example laptop computers and mobile phones (so-called "smart" phones), provide remote access to more than computer files and email. For example, users may access security systems, lighting control systems, television recording devices, and even peripheral devices (e.g., printers) for home or office computers, from just about anywhere a network connection is available, including the Internet and mobile communications networks. By way of illustration, a user at a coffee shop can print a coupon on a mobile website being viewed on their smart phone to a printer at their home or office computer. The user can then pick up the printed coupon the next time they are at home. In another illustration, a user at the airport can print a presentation from their laptop computer at the office printer, and then call a coworker at the office to retrieve the printed presentation from the printer. Of course, there are many other uses in addition to these illustrations.

Printers and other devices may be enabled for remote access by assigning a network address to the printer, such as a uniform resource locator (URL) or email address. The user can then access the printer from any network using this identification in much the same way that the user would access the printer on the local network using the printer's local area network (LAN) ID.

Unfortunately, even long and randomly assigned device IDs can be determined by unauthorized users (so-called "hackers"). The hackers can then send unauthorized communications (so-called "spam") to the printer. Not only is this unauthorized communication a nuisance for the user, it also wastes paper, ink, and other resources (e.g., electricity), and causes unnecessary wear and tear on the device.

DETAILED DESCRIPTION

Briefly, systems and methods are disclosed for establishing a secure connection between a remote platform (e.g., a smart phone) and a base station device (e.g., a printer). In one example, a system includes a cloud service configured for connection to at least one base station device and at least one remote platform. The cloud service generates a claim code, which is then issued to the base station device. A management interface is provided by the cloud service to enable access by the remote platform to the at least one base station device using the claim code.

The claim code is combined with a device identification (ID) for the base station device. This combination of claim code and device ID make the claim code unique for the base station device. To further enhance security, the claim code may only be returned to the base station device, so that the user will need to at least have physical access to the base station device in order to retrieve the claim code. This makes it unlikely that a spammer can falsely request and retrieve the claim code. To further enhance security, the claim code may expire after a predetermined time.

Accordingly, the systems and methods described herein enable inherently unsecured devices (e.g., printers) to be accessed from remote platforms (e.g., smart phones), while still providing a level of security which reduces or altogether prevents access by unauthorized users (e.g., hackers). Therefore, hackers are unable to send unauthorized communications (e.g., spam) to the printer. This level of security makes the device more user-friendly without becoming a nuisance for the user, wasting resources (e.g., paper and ink), and/or causing unnecessary wear and tear.

Figure 1:
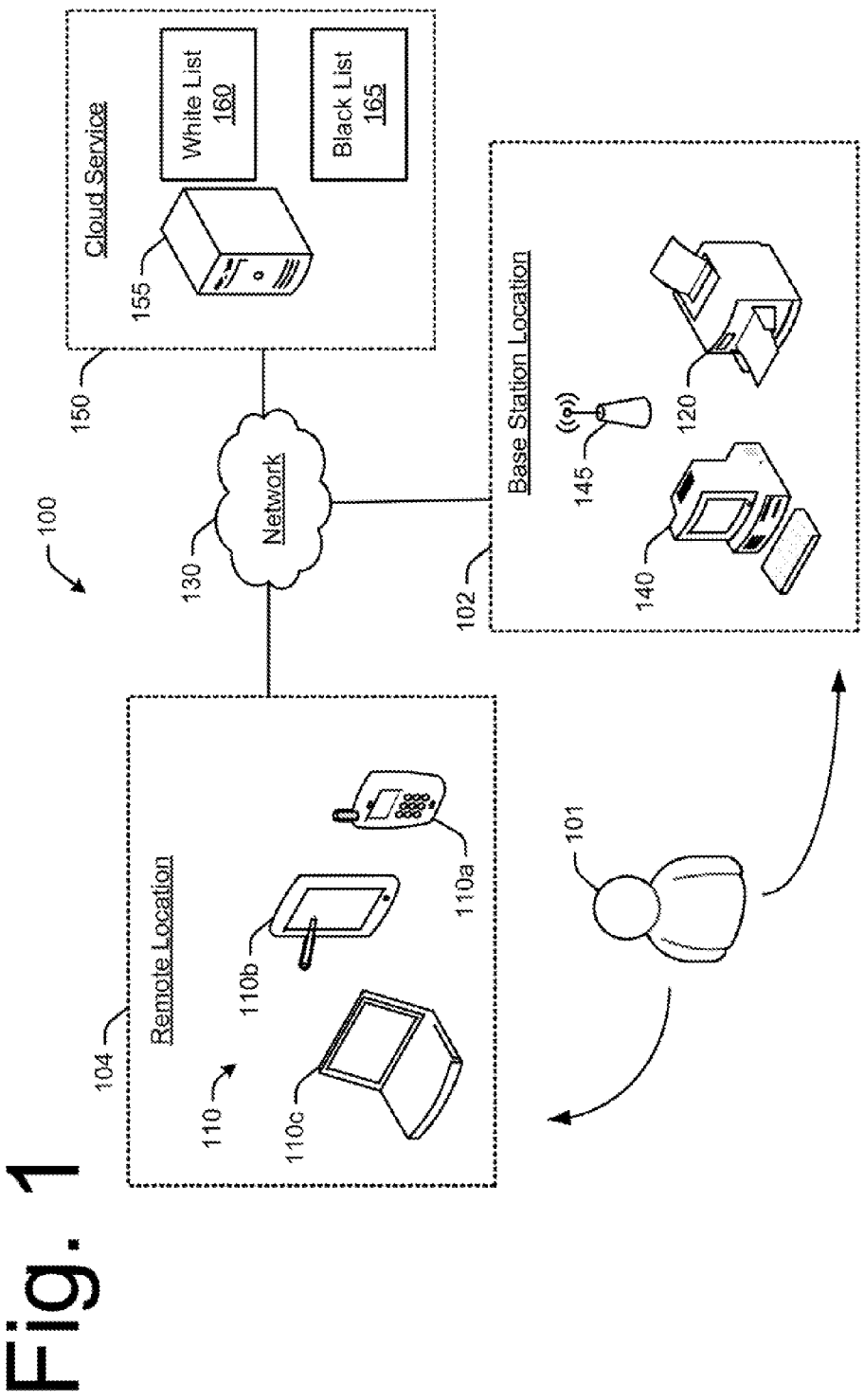
FIG. 1 is a high-level block-diagram of an exemplary networked computer system which may be implemented for establishing a secure connection between a remote platform and a base station device.

FIG. 1 is a high-level illustration of an exemplary networked computer system 100 which may be implemented for establishing a secure connection between a remote platform 110 and a base station device 120. For purposes of illustration, the remote platform 110 may be a mobile phone 110*a* (e.g., a smart phone), tablet 110*b*, or laptop computer 110*c*. Also for purposes of illustration, the base station device 120 may be a printer. However, the systems and methods described herein are not limited to use with mobile phones, laptop computers, and/or printers.

The networked computer system 100 may include one or more communication networks 130, such as a local area network (LAN) and/or wide area network (WAN). In one example, the networks 130 include the Internet or other mobile communications network (e.g., a 3G or 4G mobile device network). A host 140 may be implemented in the networked computer system 100. The host 140 may serve as an intermediary device between the remote platform 110 and the base station device 120. The host 140 may also provide services to other computing or data processing systems or devices. For example, host 140 may also provide transaction processing services, email services, etc.

As an example, host 140 may include one or more computing systems, such as a personal computer or server computer, and may include at least some degree of processing capability and computer-readable storage. The host 140 is also connected to, or able to establish a connection with, the base station device 120. By way of example, the host 140 may be a home or office computer, and the base station device 120 may be a printer. In this example, the home or office computer may be connected to the printer via a suitable wired communications link, such as a universal serial bus (USB) or over the LAN via an Ethernet connection. Alternatively, the computer may be coupled to the printer over the LAN via a suitable wireless communications link 145. In still other embodiments, the host 140 may be integrated into the base station device 120. For example, the printer may include processing capability at least sufficient to establish a communications connection directly with the network 130.

The host 140 may be provided on the network 130 via a communication connection, such as via an Internet service provider (ISP). In this regard, host 140 may be accessed by the remote platform 110 directly via the network 130, or via an agent, such as a network site. In an embodiment, the agent may include a web portal on a third-party venue (e.g., a commercial Internet site), which facilitates a connection for one or more clients with host 140. In another embodiment, portal icons may be provided (e.g., on third-party venues, pre-installed on a computer or mobile device, etc.) to facilitate a communications connection between the remote platform 110 and the host 140.

The term "remote platform" 110 as used herein refers to a computing device through which a user 101 (or users) may access the base station device 120. For purposes of illustration, the remote platform 110 may include a smart phone, a laptop computer, a "netbook" computer, or a tablet device. In other embodiments, however, the remote platform 110 may refer to any computing device which is not directly connected to the base station device 120, such as an office computer when the base station device 120 is the user's printer at home, or vice versa, where the remote platform 110 refers to the user's home computer and the base station device 120 is the user's office printer.

It is noted, however, that the remote platform 110 may be connectable to the base station device 120. For example, the remote platform 110 may be connected to the base station device 120 with a so-called "hot-plug" connection, so that the remote platform 110 may serve as an interface when registering the base station device 120, and for receiving the claim code while physically located at the base station device 120. To satisfy the definition that the remote platform 110 be usable in physically remote locations 104 from the location 102 of the base station device 120 (e.g., when the smart phone is at the coffee shop 104 and the printer is at home 102), the remote platform 110 is removable from the base station device 120 for accessing the base station device via the secure connection described herein.

Before continuing, it is noted that the computing devices described herein may include any of a wide variety of computing systems, such as a stand-alone personal desktop or laptop computers (including netbooks), workstations, personal digital assistants (PDAs), tablet devices, mobile or smart phones, and appliances (e.g., devices dedicated to providing one or more service), to name only a few examples. Each of the computing devices may include memory, storage, and a degree of data processing capability at least sufficient to manage a communications connection either directly with one another or indirectly (e.g., via a network).

In an embodiment, the remote platform 110 may communicate with the base station device 120 via a secure connection. The secure connection may be established by assigning a device ID to the base station device 120. A list of approved platforms (a so-called "white list" 160) may be associated with the base station device 120. Upon association, the base station device 120 switches from an "open mode" to a "protected mode." That is, only remote platforms 110 on the white list 160 are granted access to the base station device 120.

In addition, communications with the base station device 120 may be monitored, either in real-time or on a recurring basis as part of a history or log. If an unauthorized platform attempts communications with the base station device 120, the unauthorized platform may be added to a list of unapproved platforms (a so-called "black list" 165) associated with the base station device 120. Unapproved platforms are denied access to the base station device 120.

A user may register the base station device 120 with a cloud service 150 by establishing an account with the cloud service 150. The cloud service may be program code executable by a suitable computer system (e.g., server 155). The cloud service 150 then provides the user with access to the white list 160 and the black list 165 so that the user can add/remove platforms in the white list 160 and/or the black list 165. The user may also request a claim code from the cloud service, which enables access by the remote platform 110 to the base station device 120 via the cloud service 150 even when the remote platform 110 located in a physically remote location from the base station device 120.

Figure 2:
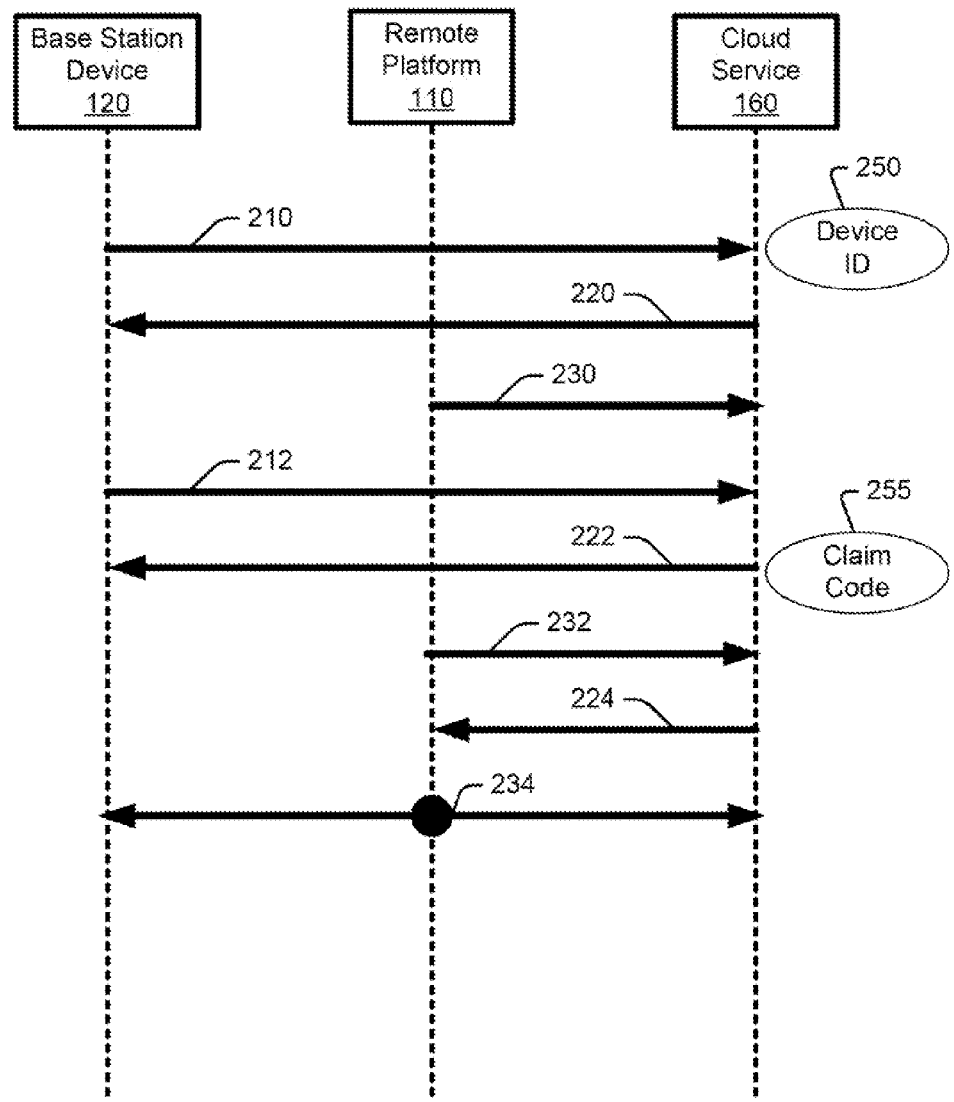
FIG. 2 is a timing diagram illustrating example communications for establishing a secure connection between a remote platform and a base station device.
Figure 3:
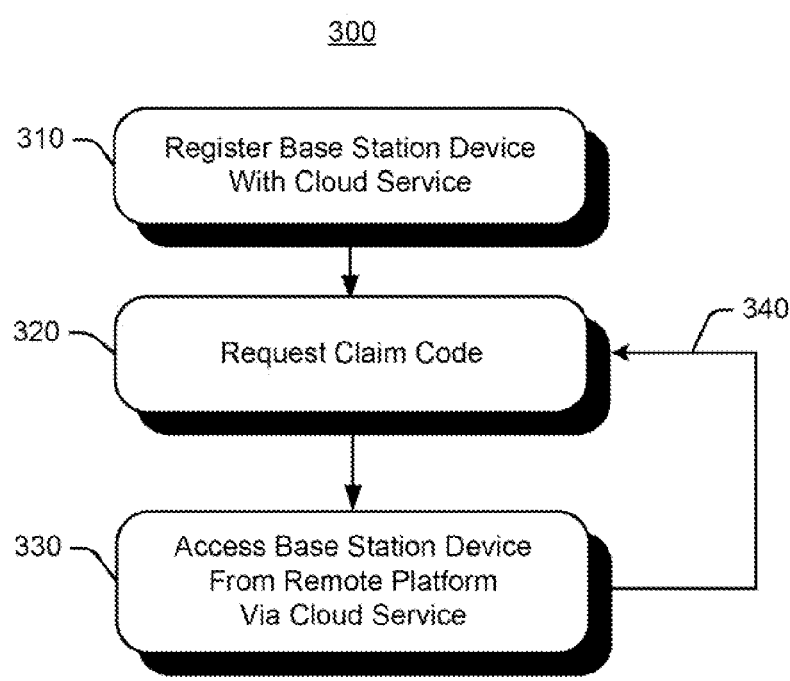
FIG. 3 is a flowchart illustrating example operations which may be implemented for establishing a secure connection between a remote platform and a base station device.

Establishing a secure connection may be better understood from the following description with reference to FIGS. 2 and 3.

FIG. 2 is a timing diagram 200 illustrating example communications for establishing a secure connection between a remote platform 110 and a base station device 120. At 210, the base station device 120 requests registration with the cloud service 150. The base station device 120 may be automatically configured to request a device ID 250. Alternatively, the user may manually request the device ID 250 at the base station device 120.

At 220, the cloud service 150 responds to the base station device 120 with a device ID 250. The device ID 250 may be unique itself. Alternatively, the device ID 250 may be further combined with a "tag" (e.g., a user password) to make the device ID 250 unique to the base station device 120. For example, the device ID 250 may be a randomly generated alpha-numeric code (e.g., 538ABC9218). The device ID 250 may further be appended to a user email (e.g., user@hp-printers.com) such that the device ID 250 comprises a combination of the randomly generated alpha-numeric code and the user email (e.g., user@hp-printers.com538ABC9218).

At 230, the user creates an account with the cloud service 150 during a registration process to claim ownership of the base station device 120. The user may set up an account, and then associate the device ID 250 of the base station device 120 with that account. The user may have more than one account (e.g., one account for each base station device). For purposes of illustration, the user may have a work account and a personal account. Alternatively, the user may associate multiple base station devices 120 with a single account. For purposes of illustration, the may include all devices at the office, home, and vacation home, in a single account.

It is noted that while the user is shown accessing the cloud service 150 from the remote platform 110 in FIG. 2, the user may access the cloud service 150 on any suitable platform, including but not limited to using the remote platform 110, the base station device 120, or another platform (not shown).

At 212, the base station device 120 requests a claim code 255 from the cloud service 150. The claim code 255 may a randomly generated alpha-numeric number, similar to the device ID 250. However, the claim code 255 is separate and distinct from the device ID 250, and likely also different than the device ID 250, to provide an added level of security.

In an embodiment, the claim code 255 includes a revolving code with respect to time. For example, the claim code 255 may be 123ABC at time t1, and DEF456 at time t2. The device ID 250 is constant (e.g., 123XYZ789 at times t1 and t2). Accordingly, combining the revolving code with the constant device ID 250 provides an access code which is unique to the base station device 120 at different times (e.g., at times t1 and t2).

It is noted that the user is shown requesting the claim code 255 from the base station device 120 in FIG. 2. However, the user may access the cloud service 150 on any suitable platform, including but not limited to using the remote platform 110, the base station device 120, or another platform (not shown).

In operation 222, the cloud service 150 responds to the base station device 120 with a claim code 255. The claim code 255 may be displayed, printed, or otherwise communicated for the user by the base station device 120. Providing the claim code 255 directly to the base station device 120 enhances security by ensuring that the claim code 255 is only provided to a user who has actual physical access to the base station device 120, at least at the time that the claim code 255 is being delivered. It is unlikely that a spammer would ever have physical access to the base station device 120 to retrieve the claim code 255.

At some time later, the user may desire to access the base station device 120 when the user is at a physically distant location from the base station. For example, the user may desire to print a coupon from a website displayed on the user's smart phone while at the coffee shop, back at the user's home printer. Or for example, the user may desire to print a presentation that the user is working on while at the airport, back to the office printer. At this point, the user has already retrieved the claim code 255 from the cloud service when the user was previously at home or at the office.

At 232, the user may connect to the cloud service 150 and send the claim code 255 to the cloud service 150. First, the cloud service 150 confirms the remote platform 110 as an authorized user of the base station device 120. For example, the cloud service 150 compares the claim code 255 with the device ID 250 for the base station device 120 that the user is requesting to access. In addition, the cloud service 150 may check the remote platform 110 against the white list 160 and/or the black list 165. This enables the user to request access to the base station device 120 from any remote platform 110, provided the remote platform 110 is on the white list 160 and/or not in the black list 165.

If the remote platform 110 is confirmed as having access to the base station device 120, then at 224, the cloud service 150 grants the remote platform 110 access to the base station device 120. The remote platform 110 may then access the base station device 120 via the cloud service 150, and the cloud service 150 manages this connection.

At 234, the user is able to manage the base station device 120 from the remote platform 110. Managing the base station device 120 may include, but is not limited to, creating and/or managing the white list 160 and/or the black list 165, accessing a job history (e.g., to check status of a print job), sending jobs to the base station device 120 (e.g., sending a print job), and so forth.

It is noted that the claim code 255 may only be valid for a predetermined time. Establishing an expiration for the claim code 255 helps ensure that if the claim code 255 is lost or intercepted, it cannot be used indefinitely. The time that the claim code 255 remains valid may be established according to a device administrator, a device policy, the cloud service, and/or the user (e.g., when the user requests the claim code 255).

For purposes of illustration, a user may set the expiration for the claim code 255 at 24 hours from the time the claim code 255 is requested. For example, the user may set the expiration based on when the user is planning to use the printer while the user is away from home. By way of further illustration, an administrator may set the expiration for the claim code 255 for 5 business days from the time the claim code 255 is requested. For example, the user may request to have access to an office printer from the administrator while the user will be away from the office on travel. In yet another illustration, a device policy may set the expiration for the claim code 255 automatically for 2 hours after it has been requested by default, for 4 hours if the user requests an extended usage time, and for 24 hours for system administrators. In another example, the expiration of the claim code 255 may correspond to an event, such as the checkout date of a guest at a hotel.

Before continuing, it should be noted that the embodiments described above are provided for purposes of illustration, and are not intended to be limiting. Other devices and/or device configurations may be utilized to carry out the operations described herein.

FIG. 3 is a flowchart illustrating example operations which may be implemented for establishing a secure connection between a remote platform and a base station device. Operations 300 may be embodied as logic instructions on one or more computer-readable medium. When executed on a processor, the logic instructions cause a general purpose computing device to be programmed as a special-purpose machine that implements the described operations. In an exemplary implementation, the components and connections depicted in the figures may be used.

In operation 310, a base station device may be registered with a cloud service. For example, a printer may be registered with a cloud service. The printer may be automatically registered when the user registers the product with the manufacturer. Or the printer may be manually registered. In another example, the user may register a new printer with an existing user account.

In operation 320, a claim code 255 may be requested from the cloud service for the base station device. For example, the user may request the claim code 255 using the printer, and the claim code 255 may be printed on or displayed (or otherwise output) by the printer. In another example, the user may request the claim code 255 from another device (e.g., a smart phone), but the user has to go to the printer to retrieve the claim code 255.

In operation 330, access may be provided from a remote platform to the base station device based on the registration of the base station device and the claim code 255. For example, the user may be at a distant location relative to the printer, but the user wants to print something from their mobile phone. The user provides a device ID 250 for the printer, and the claim code 255 retrieved during operation 320, along with the print request, and the cloud service provides the user with remote printing capability.

It is noted that various operations may be automated or partially automated. For example, the user may select a print icon from the smart phone, the user is then prompted to enter the claim code 255, and the page prints to the printer device. Or for example, the user may enter the claim code 255 in advance, and then be able to print from the smart phone to the printer from any location until the claim code 255 expires. When the claim code 255 expires, the user can obtain another claim code 255, e.g., as illustrated by arrow 340 returning to operation 320.

The operations shown and described herein are provided to illustrate various embodiments for establishing a secure connection between a remote platform and a base station device. It is noted that the operations are not limited to the ordering shown. Still other operations may also be implemented.

For purposes of illustration, further operations may include combining the claim code 255 with a device ID 250 entification to make the claim code 255 unique for the base station device. Further operations may also include returning the claim code 255 only to the base station device. Further operations may also include expiring the claim code 255 after a predetermined time. Further operations may also include receiving the claim code 255 by the cloud service from the remote platform before providing access to the base station device.

Still further operations may also include checking the remote platform against a white list 160 and a black list 165 before providing access to the base station device. Further operations may also include monitoring attempted access to the base station device, and adding unauthorized platforms to the blacklist.

Yet further operations may also include managing the base station device from the remote platform after the cloud service provides access to the base station device. Further operations may also include registering the remote platform using at least one security credential.

It is noted that the exemplary embodiments shown and described are provided for purposes of illustration and are not intended to be limiting. Still other embodiments are also contemplated.

The invention claimed is:

1. A method of establishing a secure connection between a remote platform and a base station device, comprising:
   registering a base station device with a cloud service;
   requesting from the cloud service, a claim code for the base station device; and
   outputting the claim code by the base station device for the remote platform when a user of the remote platform has physical access to the base station device, the claim code sent by the remote platform to the cloud service with a request to access the base station device to enable the remote platform to communicate with the base station device via the cloud service when the user of the remote platform no longer has physical access to the base station device when a comparison of the claim code confirms the remote platform as having access to the base station device.

2. The method of claim 1, wherein the claim code is combined with a device Identification (ID) to make the claim code unique for the base station device.

3. The method of claim 1, further comprising receiving the claim code from the cloud service only at the base station device as a security measure to ensure that the claim code is only provided to a user having physical access to the base station device.

4. The method of claim 1, wherein the claim code expires after an event occurs.

5. The method of claim 1, wherein the base station device is only accessible by the remote platform after the claim code is received by the cloud service from the remote platform.

6. The method of claim 1, wherein the base station device is only accessible by the remote platform after the remote platform is checked against a white list and a black list.

7. The method of claim 1, wherein the base station device is only accessible by the remote platform after monitoring attempted access to the base station device, and wherein unauthorized platforms are added to a blacklist.

8. The method of claim 1, wherein the base station device receives management commands from the remote platform after the cloud service provides access to the base station device.

9. The method of claim 1, further comprising registering the remote platform using at least one security credential.

10. The method of claim 1, wherein the claim code is only provided to a user who has actual physical access to the base station device at the time the claim code is delivered.

11. The method of claim 1, wherein the remote platform serves as an interface when registering the base station device and for receiving the claim code while physically located at the base station device.

12. A system, comprising:
   a cloud service configured for connection to at least one base station device and at least one remote platform, wherein the base station device registers with the cloud service;
   a claim code generated by the cloud service, the claim code issued to the base station device for establishing a secure connection between the at least one remote platform and the at least one base station device, wherein the base station device is to output the claim code for the at least one remote platform when the at least one remote platform is connected to the base station device; and
   a management interface of the cloud service to enable access by the remote platform to the at least one base station device using the claim code sent by the remote platform to the cloud service with a request to access the at least one base station device when a comparison of the claim code confirms the remote platform as having access to the base station device.

13. The system of claim 12, wherein the claim code is combined with a device Identification (ID) to make the claim code unique for the base station device.

14. The system of claim 12, wherein the cloud service only returns the claim code to the base station device.

15. The system of claim 12, wherein the claim code expires after a predetermined time.

16. The system of claim 12, wherein the cloud service only provides access by the at least one remote platform to the at least one base station device after the claim code is received by the cloud service from the at least one remote platform.

17. The system of claim 12, further comprising a white list and a black list, wherein the cloud service only grants access to the at least one base station device if the remote platform clears at least one of the white list and the black list.

18. The system of claim 12, wherein the management interface provides printing services from the remote platform at the base station device.

19. A printing system, comprising:
   a printer device having processing capability at least sufficient to establish a communications connection with a wide area network and a cloud service operatively associated with the printer device on the wide area network, the printer device registering with the cloud service
   the printer device to output a claim code for a mobile device when the mobile device is local to the printer device; and
   wherein the printer device is accessible by the mobile device via the cloud service based on registration of the printer device with the cloud service, when the claim code for the printer device is sent by the mobile device to the cloud service with a request to access the printer device and a comparison of the claim code confirms the mobile device as having access to the printer device.

20. The printing system of claim 19, wherein the claim code includes a revolving code with respect to time, the revolving code is combined with a constant device Identification (ID) for the printer device, the combination of the revolving code and the constant device ID being different for the printer device at different times.

* * * * *